US012341269B2

(12) United States Patent
Lin et al.

(10) Patent No.: US 12,341,269 B2
(45) Date of Patent: Jun. 24, 2025

(54) ANTENNA DEVICE

(71) Applicants: Inventec (Pudong) Technology Corporation, Shanghai (CN); INVENTEC CORPORATION, Taipei (TW)

(72) Inventors: Hsin-Hung Lin, Taipei (TW); Yu Shu Tai, Taipei (TW); Wei-Chen Cheng, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 260 days.

(21) Appl. No.: 18/115,837

(22) Filed: Mar. 1, 2023

(65) Prior Publication Data

US 2024/0154314 A1 May 9, 2024

(30) Foreign Application Priority Data

Nov. 7, 2022 (CN) ......................... 202211384998.0

(51) Int. Cl.
*H01Q 9/04* (2006.01)
*H01Q 1/48* (2006.01)
*H01Q 1/52* (2006.01)

(52) U.S. Cl.
CPC ............... *H01Q 9/045* (2013.01); *H01Q 1/48* (2013.01); *H01Q 1/521* (2013.01)

(58) Field of Classification Search
CPC .......... H01Q 1/52; H01Q 1/521; H01Q 1/523; H01Q 1/526; H01Q 9/04; H01Q 9/0407; H01Q 9/045
See application file for complete search history.

(56) References Cited

U.S. PATENT DOCUMENTS

| | | | | |
|---|---|---|---|---|
| 5,952,983 A * | 9/1999 | Dearnley | H01Q 1/523 | 343/810 |
| 6,515,633 B2 * | 2/2003 | Ippolito | H01Q 1/246 | 343/797 |
| 2006/0176211 A1 * | 8/2006 | Mohamadi | H01Q 21/0093 | 342/51 |
| 2012/0176292 A1 * | 7/2012 | Hung | H01Q 1/38 | 343/846 |
| 2012/0194391 A1 * | 8/2012 | Liu | H01Q 21/28 | 343/700 MS |
| 2013/0293426 A1 * | 11/2013 | Hung | G06F 1/1698 | 343/702 |

(Continued)

*Primary Examiner* — Jason M Crawford
(74) *Attorney, Agent, or Firm* — troutman Pepper Locke; Tim Tingkang Xia, Esq.

(57) ABSTRACT

An antenna device includes a substrate, two T-shaped radiation portions, two feeding portions and an isolation structure. The substrate has an upper surface, a side surface and a lower surface. Two opposite ends of the side surface are connected to the upper surface and the lower surface, respectively. The two T-shaped radiation portions are located on the upper surface of the substrate. The two feeding portions are connected to the two T-shaped radiation portions, respectively, and the two feeding portions are located on the side surface of the substrate. The isolation structure is located on the upper surface of the substrate, and the isolation structure is disposed between the two T-shaped radiation portions.

9 Claims, 7 Drawing Sheets

10

(56) References Cited

U.S. PATENT DOCUMENTS

| | | | | |
|---|---|---|---|---|
| 2013/0321234 | A1* | 12/2013 | Lin | H01Q 21/28 343/893 |
| 2014/0062797 | A1* | 3/2014 | Ke | H01Q 1/521 343/702 |
| 2015/0214612 | A1* | 7/2015 | Chen | H01Q 1/525 343/841 |
| 2016/0111777 | A1* | 4/2016 | Yang | H01Q 9/04 343/841 |
| 2017/0264012 | A1* | 9/2017 | Clark | H01Q 1/523 |
| 2019/0131700 | A1* | 5/2019 | Chao | H01Q 1/241 |
| 2020/0021021 | A1* | 1/2020 | Lin | H01Q 5/307 |
| 2021/0111486 | A1* | 4/2021 | Tamrakar | H01Q 1/2266 |
| 2022/0094038 | A1* | 3/2022 | Wang | H01Q 5/25 |
| 2023/0120328 | A1* | 4/2023 | Kartout | H01Q 9/285 343/702 |
| 2024/0047856 | A1* | 2/2024 | Wu | H01Q 21/28 |
| 2024/0154314 | A1* | 5/2024 | Lin | H01Q 1/48 |
| 2024/0170838 | A1* | 5/2024 | Izawa | H01Q 9/0407 |

* cited by examiner

ANTENNA DEVICE

CROSS-REFERENCE TO RELATED APPLICATIONS

This non-provisional application claims priority under 35 U.S.C. § 119(a) on patent application No(s). 202211384998.0 filed in China, on Nov. 7, 2022, the entire contents of which are hereby incorporated by reference.

BACKGROUND OF THE INVENTION

Technical Field of the Invention

The invention relates to an antenna device, more particularly to an antenna device having an isolation structure.

Description of the Related Art

With the advancement of wireless communication technology, electronic devices such as mobile phones and personal digital assistants have more diversified functions and enhanced performance, and become lighter and thinner. In particular, the wireless communication technology will enter the 6G era in 2030 and satisfy various requirements for life applications and business that 5G cannot meet.

However, more electronic components should be placed into the electronic devices to diversify the functions of the electronic device, and the electronic device is becoming lighter and thinner. Thus, the space in the electronic devices for accommodating antennas is limited, and thus the antenna should be reduced in size to be accommodated in such limited space. Therefore, the arrangement density of the antennas in the electronic device is increased, such that the isolation between the antennas is deteriorated. With the isolation between the antennas is deteriorated, the signal interference between the antennas becomes more severe and the reflection loss of the antennas is increased, thereby causing the bandwidth of the antennas to be narrowed. Thus, a technical solution should be provided to enhance the isolation between the antennas so as to reduce the signal interference between the antennas and the reflection loss of the antennas, thereby widen the bandwidth of the antennas to meet the requirements of the advanced wireless communication technology.

SUMMARY OF THE INVENTION

The invention provides an antenna device with small volume, while having two T-shaped radiation portions with enhanced isolation therebetween.

One embodiment of the invention provides an antenna device including a substrate, two T-shaped radiation portions, two feeding portions and an isolation structure. The substrate has an upper surface, a side surface and a lower surface. Two opposite sides of the side surface are connected to the upper surface and the lower surface, respectively. The two T-shaped radiation portions are located on the upper surface of the substrate. The two feeding portions are connected to the two T-shaped radiation portions, respectively, and the two feeding portions are located on the side surface of the substrate. The isolation structure is located on the upper surface of the substrate, and the isolation structure is disposed between the two T-shaped radiation portions.

According to the wireless charging module and the wireless charging assembly disclosed by above embodiments, since the isolation structure is disposed between the two T-shaped radiation portions, when a distance between the two T-shaped radiation portions is required to be reduced, the isolation between the two T-shaped radiation portions can be improved by the isolation structure. Accordingly, even though the two T-shaped radiation portions are densely arranged, the isolation between the antennas can be enhanced via the isolation structure so as to reduce the signal interference between the antennas and the reflection loss of the antenna device. Thus, the volume of the antenna device is allowed to be reduced while maintaining the wide bandwidth ranging from 3.37 gigahertz (GHz) to 14.97 GHz, thereby meeting the requirements of the advanced wireless communication technology.

BRIEF DESCRIPTION OF THE DRAWINGS

The present invention will become more fully understood from the detailed description given herein below and the accompanying drawings which are given by way of illustration only and thus are not limitative of the present invention and wherein.

DETAILED DESCRIPTION

Figure 1:
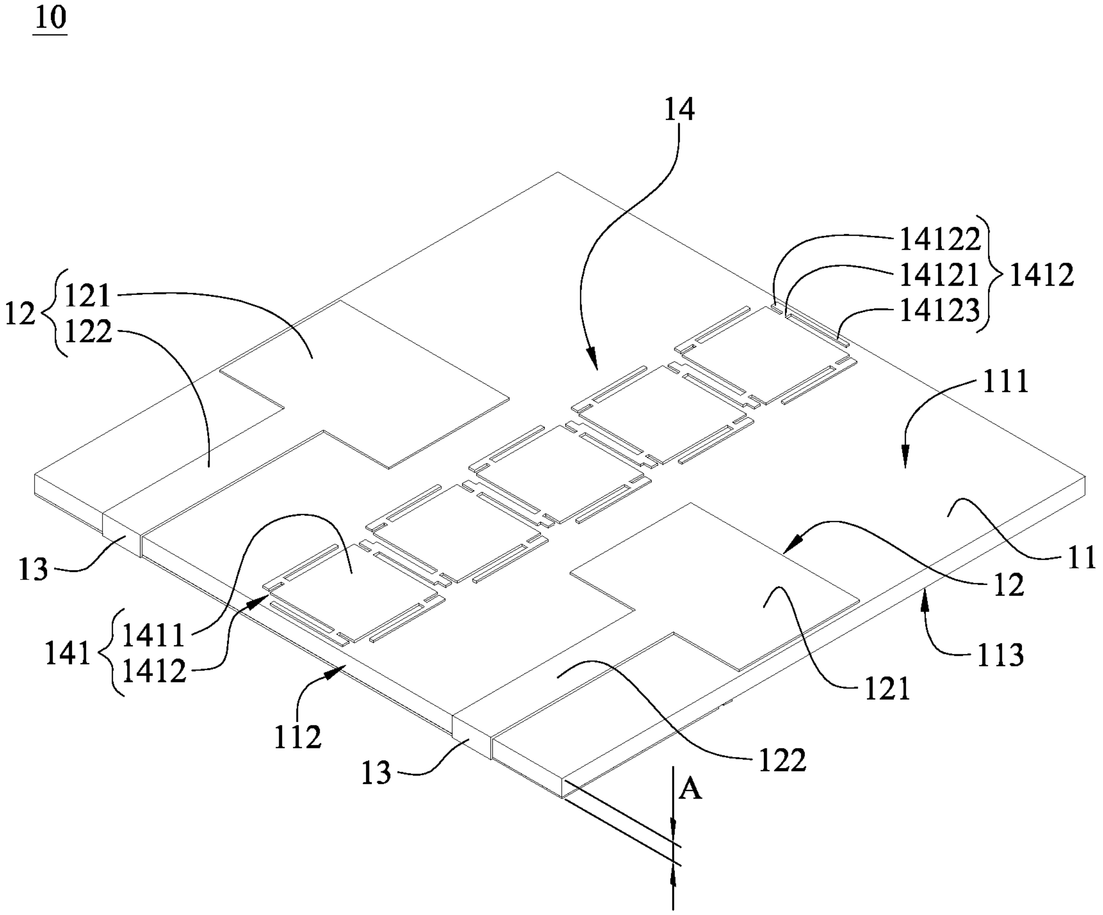
FIG. 1 is a perspective view of an antenna device in accordance with a first embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present invention, such as technical and scientific terms, have its own meanings and can be comprehended by those skilled in the art, unless the terms are additionally defined in the present invention. That is, the terms used in the following paragraphs should be read on the meaning commonly used in the related fields and will not be overly explained, unless the terms have a specific meaning in the present invention.

Figure 2:
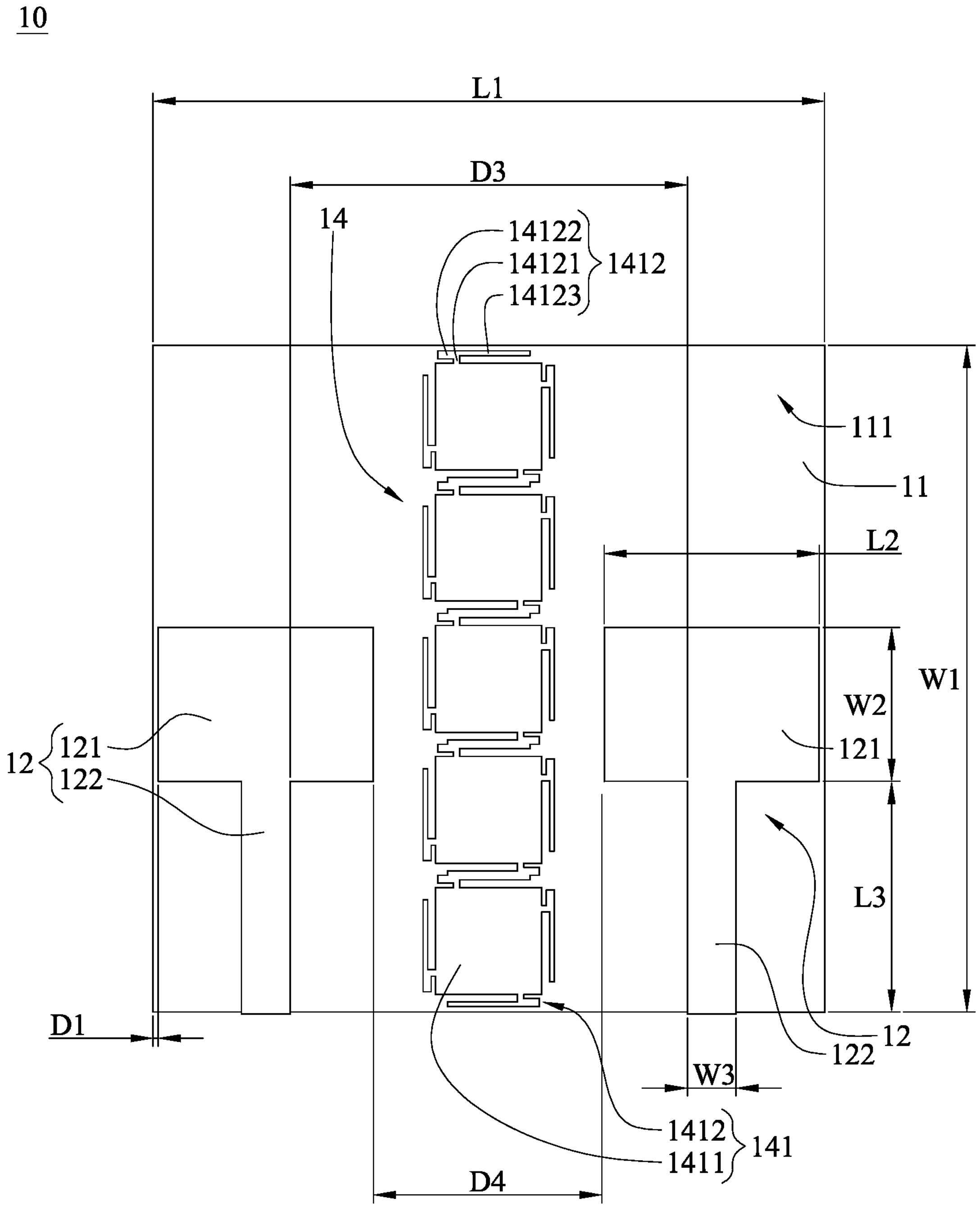
FIG. 2 is a top view of the antenna device in accordance with the first embodiment of the invention.
Figure 3:
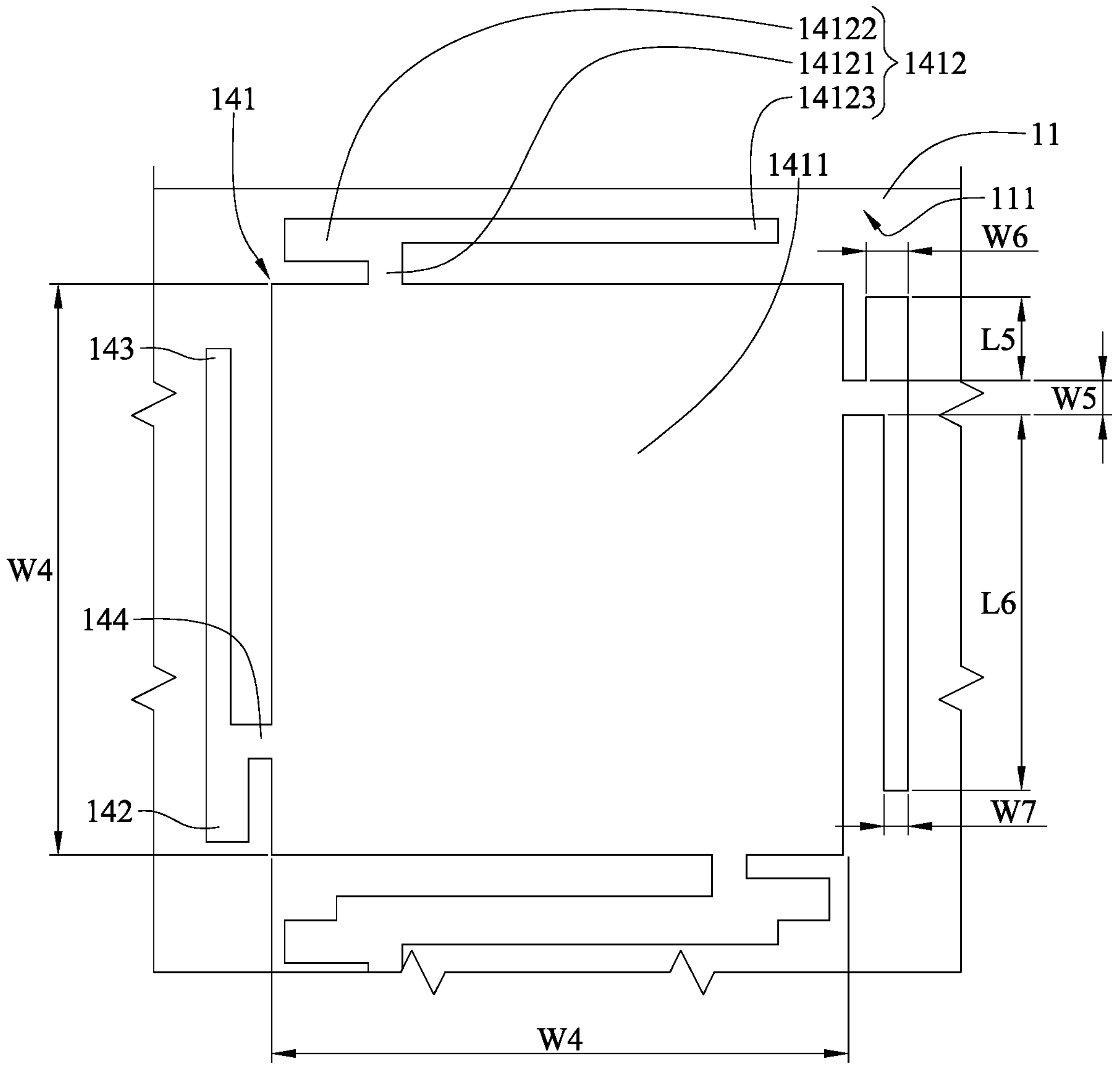
FIG. 3 is a partial enlarged view of the antenna device in FIG. 2.

Please refer to FIG. 1 to FIG. 3, where FIG. 1 is a perspective view of an antenna device 10 in accordance with a first embodiment of the invention, FIG. 2 is a top view of the antenna device 10 in accordance with the first embodiment of the invention, and FIG. 3 is a partial enlarged view of the antenna device 10 in FIG. 2.

In this embodiment, the antenna device 10 includes a substrate 11, two T-shaped radiation portions 12, two feeding portions 13 and an isolation structure 14. The substrate 11 is made of, for example, a glass fiber material. The substrate 11 has an upper surface 111, a side surface 112 and a lower surface 113. Two opposite sides of the side surface 112 are connected to the upper surface 111 and the lower surface 113, respectively. The two T-shaped radiation portions 12 are located on the upper surface 111 of the substrate 11. Each of the two T-shaped radiation portions 12 includes a first radiation unit 121 and a second radiation unit 122 that are connected to each other. The two feeding portions 13 are connected to the two second radiation units 122 of the two T-shaped radiation portions 12, respectively, and are located on the side surface 112 of the substrate 11.

In this embodiment, a length L1 of the substrate 11 is 26.2 millimeters (mm). A width W1 of the substrate 11 is 26 mm. A thickness A of the substrate 11 is 0.8 mm.

In this embodiment, a length L2 of each of the two first radiation units 121 is 8.4 mm. A width W2 of each of the two first radiation units 121 is 6 mm. A distance D1 between each of the two first radiation units 121 and a side of the upper surface 111 closest to the first radiation unit 121 is 0.2 mm. A length L3 of each of the two second radiation units 122 is 9 mm. A width W3 of each of the two second radiation units 122 is 1.9 mm. A distance D3 between the two first radiation units 121 is 9 mm. A distance D4 between the two second radiation units 122 is 15 mm.

The isolation structure 14 is located on the upper surface 111 of the substrate 11, and the isolation structure 14 is disposed between the two T-shaped radiation portions 12. The isolation structure 14 is made of, for example, a material capable of shielding an electromagnetic wave. The isolation structure 14 includes a plurality of isolation units 141. The plurality of isolation units 141 are arranged along a straight line, and any two of the isolation units 141 that are adjacent are connected to each other. In detail, each of the plurality of isolation units 141 includes a square portion 1411 and a plurality of T-shaped portions 1412. The plurality of T-shaped portions 1412 are connected to different sides of the square portion 1411, respectively. Each of the T-shaped portions 1412 includes a connection part 14121, a first protrusion part 14122 and a second protrusion part 14123. The connection part 14121 is connected to the square portion 1411. The first protrusion part 14122 and the second protrusion part 14123 are connected to the connection part 14121. The first protrusion part 14122 and the second protrusion part 14123 are perpendicular to the connection part 14121. The first protrusion part 14122 and the second protrusion part 14123 protrude from the connect part 14121 along opposite directions, respectively. A length L5 of the first protrusion part 14122 is different from and a length L6 of the second protrusion part 14123. That is, the plurality of T-shaped portions 1412 are asymmetrical. Thus, not only an interference between the two T-shaped radiation portions 12 but also a reflection loss can be reduced.

In this embodiment, a length L4 and a width W4 of each of the square portions 1411 both are 4.1 mm. A width W5 of each of the connection parts 14121 is 0.2 mm. The length L5 of each of the first protrusion parts 14122 is 0.6 mm. A width W6 of each of the first protrusion parts 14122 is 0.3 mm. The length L6 of each of the second protrusion parts 14123 is 2.7 mm. A width W7 of each of the second protrusion parts 14123 is 0.1 mm.

Figure 4:
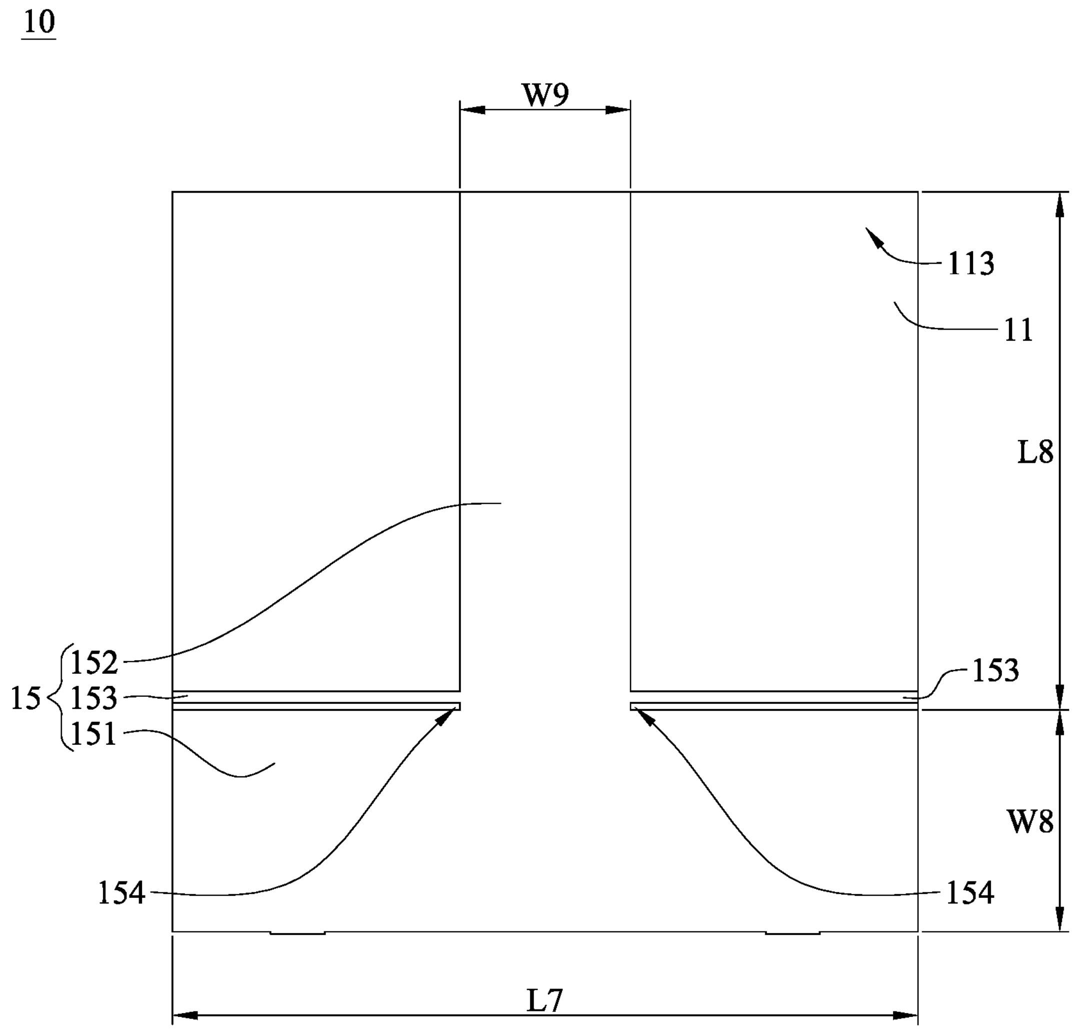
FIG. 4 is a bottom view of the antenna device in accordance with the first embodiment of the invention.
Figure 5:
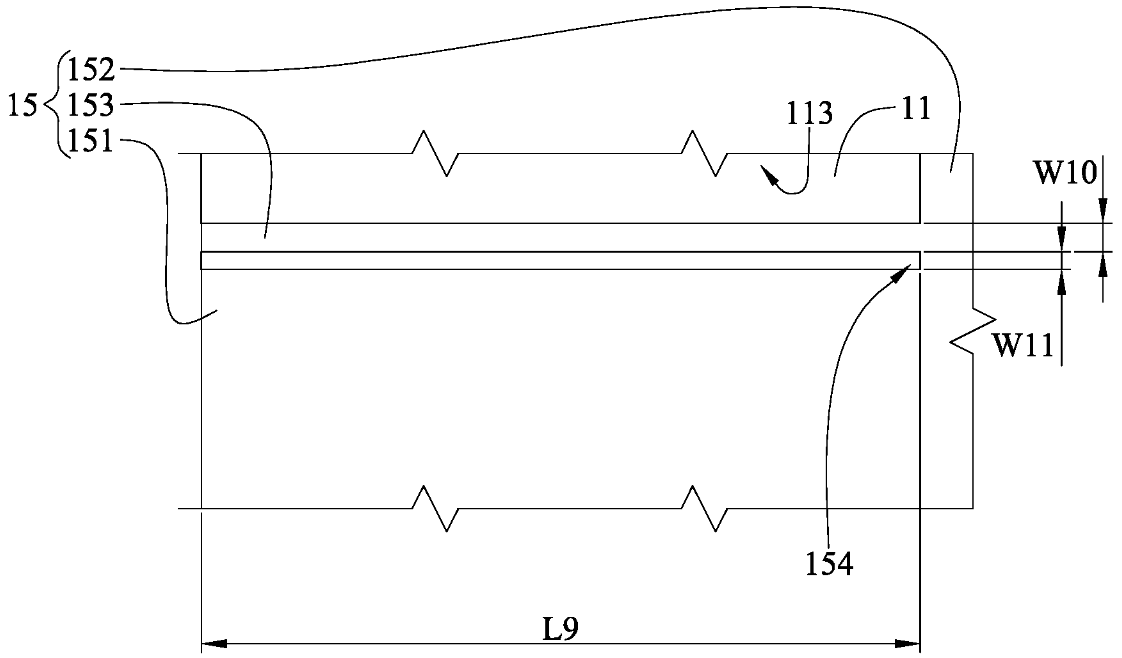
FIG. 5 is a partial enlarged view of the antenna device in FIG. 4.

Please refer to FIG. 4 and FIG. 5, where FIG. 4 is a bottom view of the antenna device 10 in accordance with the first embodiment of the invention, and FIG. 5 is a partial enlarged view of the antenna device 10 in FIG. 4.

In this embodiment, the antenna device 10 may further include a T-shaped ground structure 15. The T-shaped ground structure 15 is located on the lower surface 113 of the substrate 11. The T-shaped ground structure 15 includes a first ground portion 151, a second ground portion 152 and two third ground portions 153. The second ground portion 152 is connected to a center of the first ground portion 151. The two third ground portions 153 are connected to two opposite sides of the second ground portion 152, respectively. Each of the two third ground portions 153 forms a slit 154 together with the first ground portion 151.

In this embodiment, the purpose which the two third ground portions 153 are disposed and each of the two third ground portions 153 and the first ground portion 151 together form a slit 154 is that the antenna device 10 can be matched to the 6G frequency band ranging from 13 GHz to 14.5 GHz via the two slits 154, so that the reflection loss of the antenna device 10 can be lower than −10 dB (amplitude).

In this embodiment, a length L7 of the first ground portion 151 is 26.2 mm. A width W8 of the first ground portion 151 is 7.8 mm. A length L8 of the second ground portion 152 is 18.2 mm. A width W9 of the second ground portion 152 is 6 mm. A length L9 of the two third ground portions 153 is 10.1 mm. A width W10 of each of the two third ground portions 153 is 0.4 mm. A width W11 of each of the two slits 154 is 0.25 mm.

Figure 6:
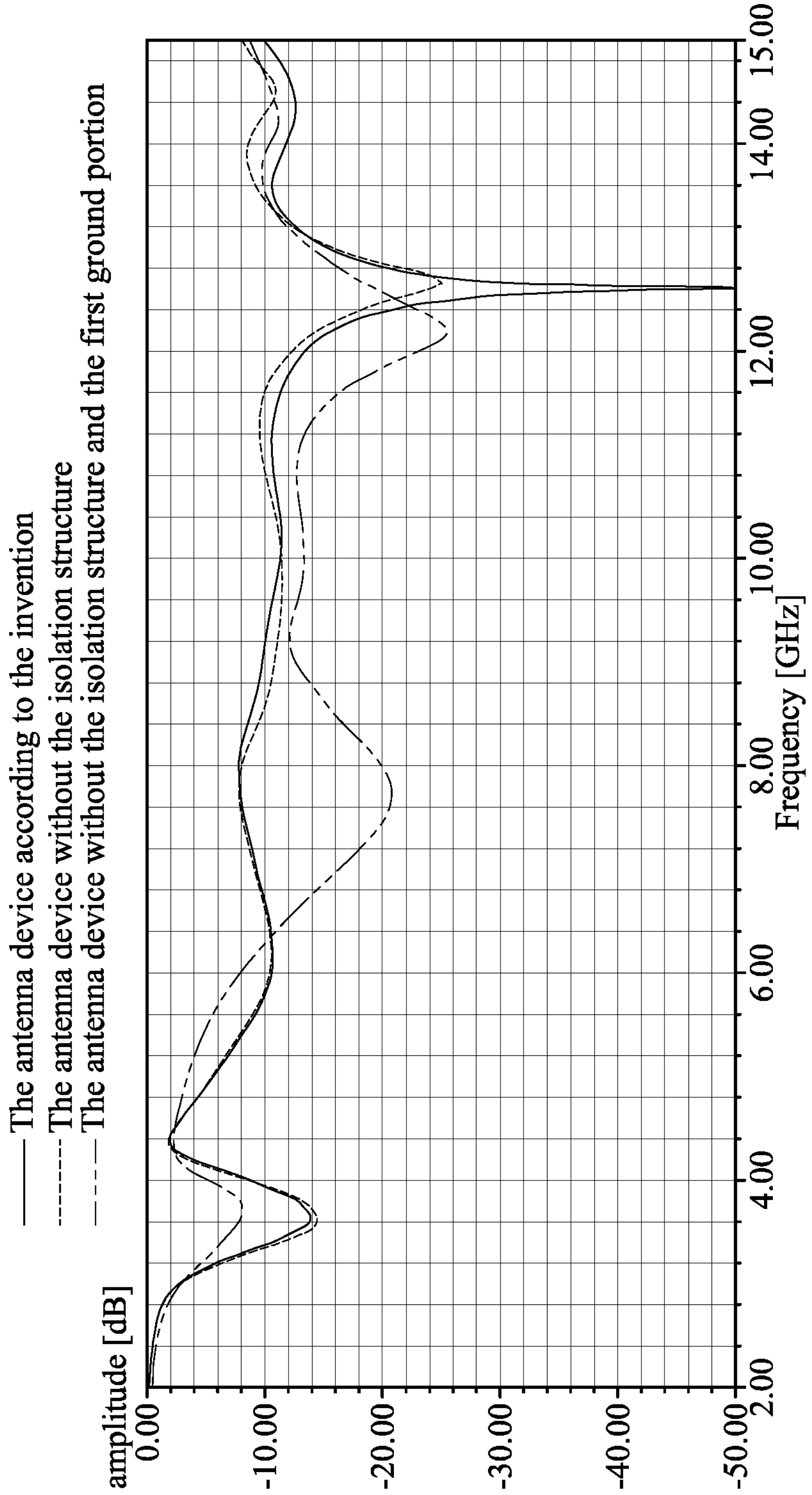
FIG. 6 is a line graph showing reflection loss data among different antenna devices.

Please refer to FIG. 6, which is a line graph showing reflection loss data among different antenna devices. Compared with the antenna device without the isolation structure according to the invention and the antenna device without the isolation structure and the first ground portion according to the invention, in the 6G frequency band ranging from 10.7 GHz to 14.5 GHz, an n78 frequency band ranging from 3.3 GHz to 14.5 GHz in a 5G frequency band or a WIFI-6E frequency band ranging from 5.925 GHz to 7.125 GHz, the reflection loss of the antenna device 10 of the present invention is lower than −6 dB in all of the aforementioned frequency bands, as shown in FIG. 6. In addition, in the 6G frequency band and the n78 frequency band in the 5G frequency band, the reflection loss of the antenna device 10 of the present invention is lower than −10 dB in both of the aforementioned frequency bands, and in the WIFI-6E frequency band, the reflection loss of only a few frequency bands is slightly higher than −10 dB. The antenna device without the isolation structure and the first ground portion according to the invention has a reflection loss higher than −6 dB in some frequency bands in the n78 frequency band in the 5G frequency band, and each of the antenna device without the isolation structure according to the invention and the antenna device without the isolation structure and the first ground portion according to the invention has a reflection loss higher than −10 dB in some frequency bands in the 6G frequency band. Therefore, the antenna device according to the invention can reduce the reflection loss via the isolation structure 14 and the first ground portion 151.

Figure 7:
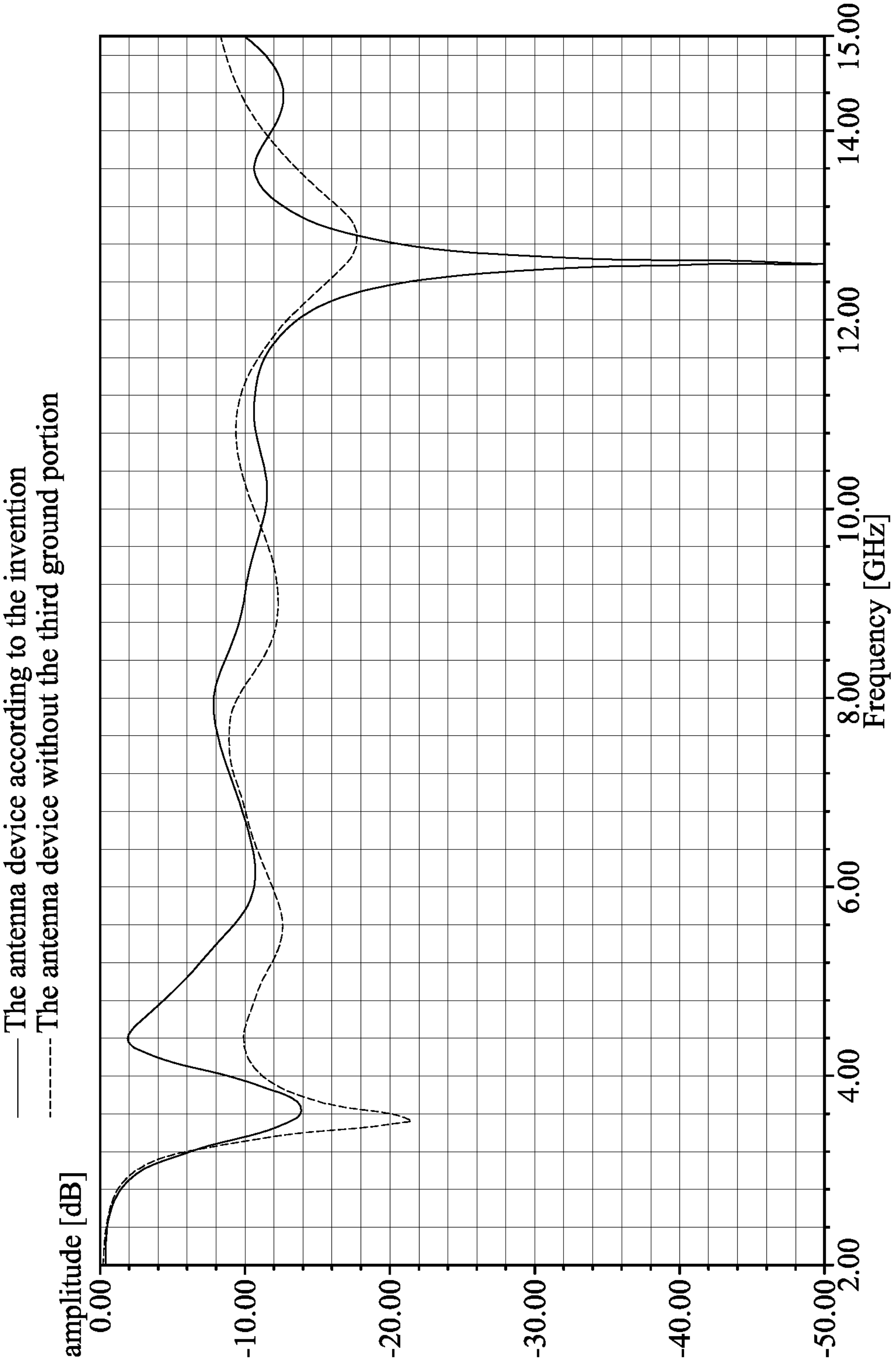
FIG. 7 is another line graph of showing reflection loss data among different antenna devices.

Please refer to FIG. 7, which is another line graph of showing reflection loss data among different antenna devices. Compared with the antenna device without the third ground portion according to the invention, in the 6G frequency band ranging from 10.7 GHz to 14.5 GHz, the n78 frequency band ranging from 3.3 GHz to 14.5 GHz in the 5G frequency band or the WIFI-6E frequency band ranging from 5.925 GHz to 7.125 GHz, the reflection loss of the antenna device 10 of the present invention is all lower than −6 dB in all of the aforementioned frequency bands, as shown in FIG. 7. In addition, in the 6G frequency band and the n78 frequency band in the 5G frequency band, the reflection loss of the antenna device 10 of the present invention is lower than −10 dB in both of the aforementioned frequency bands, and in the WIFI-6E frequency band, the reflection loss of only a few frequency bands is slightly higher than −10 dB. The antenna device without the third ground portion according to the invention has the reflection loss higher than −10 dB in some frequency bands in the 6G frequency band ranging from 10.7 GHz to 14.5 GHz. Therefore, the antenna device according to the invention can reduce the reflection loss via the third ground portion 153.

According to the wireless charging module and the wireless charging assembly disclosed by above embodiments, since the isolation structure is disposed between the two T-shaped radiation portions, when a distance between the two T-shaped radiation portions is required to be reduced, the isolation between the two T-shaped radiation portions can be improved by the isolation structure. Accordingly, even though the two T-shaped radiation portions are densely arranged, the isolation between the antennas can be enhanced via the isolation structure so as to reduce the signal interference between the antennas and the reflection loss of the antenna device. Thus, the volume of the antenna device is allowed to be reduced while maintaining the wide bandwidth ranging from 3.37 GHz to 14.97 GHz, thereby meeting the requirements of the advanced wireless communication technology.

It will be apparent to those skilled in the art that various modifications and variations can be made to the present invention. It is intended that the specification and examples be considered as exemplary embodiments only, with the scope of the invention being indicated by the following claims and their equivalents.

What is claimed is:

1. An antenna device, comprising:

a substrate, having an upper surface, a side surface and a lower surface, wherein two opposite ends of the side surface are connected to the upper surface and the lower surface, respectively;

two T-shaped radiation portions, located on the upper surface of the substrate;

two feeding portions, connected to the two T-shaped radiation portions, respectively, wherein the two feeding portions are located on the side surface of the substrate; and an isolation structure, located on the upper surface of the substrate, wherein the isolation structure is disposed between the two T-shaped radiation portions, and comprises a plurality of isolation units, the plurality of isolation units are arranged along a straight line, and any two of the plurality of isolation units that are adjacent are connected to each other, each of the plurality of isolation units comprises a square portion and a plurality of T-shaped portions that are connected to different sides of the square portion, respectively, and each of the plurality of T-shaped portions comprises a connection part, a first protrusion part and a second protrusion part, the connection part is connected to the square portion, the first protrusion part and the second protrusion part are connected to the connection part, the first protrusion part and the second protrusion part are perpendicular to the connection part and protrude from the connection part along opposite directions, respectively, and a length of the first protrusion part is different from a length of the second protrusion part.

2. The antenna device according to claim 1, wherein each of the two T-shaped radiation portions comprises a first radiation unit and a second radiation unit, the first radiation unit is connected to the second radiation unit, and the two second radiation units are connected to the two feeding portions, respectively.

3. The antenna device according to claim 2, wherein a length of the substrate is 26.2 millimeters, a width of the substrate is 26 millimeters, a thickness of the substrate is 0.8 millimeters, a length of each of the two first radiation units is 8.4 millimeters, a width of each of the two first radiation units is 6 millimeters, a distance between each of the two first radiation units and a side of the upper surface closest to the first radiation unit is 0.2 millimeters, a length of each of the two second radiation units is 9 millimeters, a width of each of the two second radiation units is 1.9 millimeters, and a distance between the two first radiation units is 9 millimeters, a distance between the two second radiation units is 15 millimeters.

4. The antenna device according to claim 1, wherein a length and a width of the square portion both are 4.1 millimeters, the length of the first protrusion part is 0.6 millimeters, a width of the first protrusion part is 0.3 millimeters, the length of the second protrusion part is 2.7 millimeters, a width of the second protrusion part is 0.1 millimeters, and a width of the connection part is 0.2 millimeters.

5. The antenna device according to claim 1, further comprising a T-shaped ground structure, wherein the T-shaped ground structure is located on the lower surface of the substrate.

6. The antenna device according to claim 5, wherein the T-shaped ground structure comprises a first ground portion, a second ground portion and two third ground portions, the second ground portion is connected to a center of the first ground portion, the two third ground portions are connected to two opposite sides of the second ground portion, respectively, and each of the two third ground portions forms a slit together with the first ground portion.

7. The antenna device according to claim 6, wherein a length of the first ground portion is 26.2 millimeters, a width of the first ground portion is 7.8 millimeters, a length of the second ground portion is 18.2 millimeters, a width of the second ground portion is 6 millimeters, a length of each of the two third ground portions is 10.1 millimeters, a width of each of the two third ground portions is 0.4 millimeters, and a width of each of the two slits is 0.25 millimeters.

8. The antenna device according to claim 1, wherein the substrate is made of a glass fiber material.

9. The antenna device according to claim 1, wherein the isolation structure is made of a material configured to shield an electromagnetic wave.

* * * * *